Dec. 26, 1922.
A. H. WEBER.
ANTISKID CHAIN APPLYING AND REMOVING DEVICE.
FILED NOV. 22, 1920.
1,439,933
9 SHEETS-SHEET 1
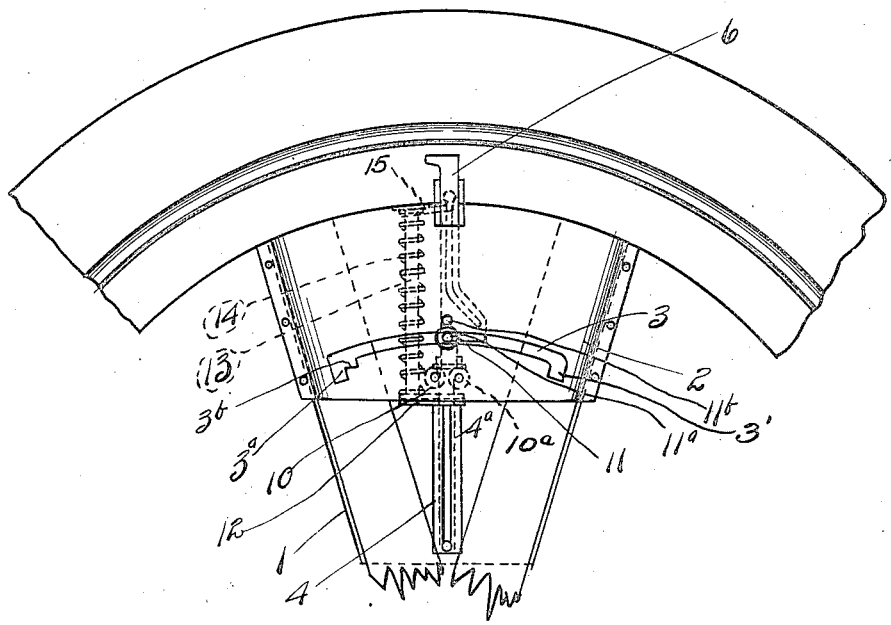
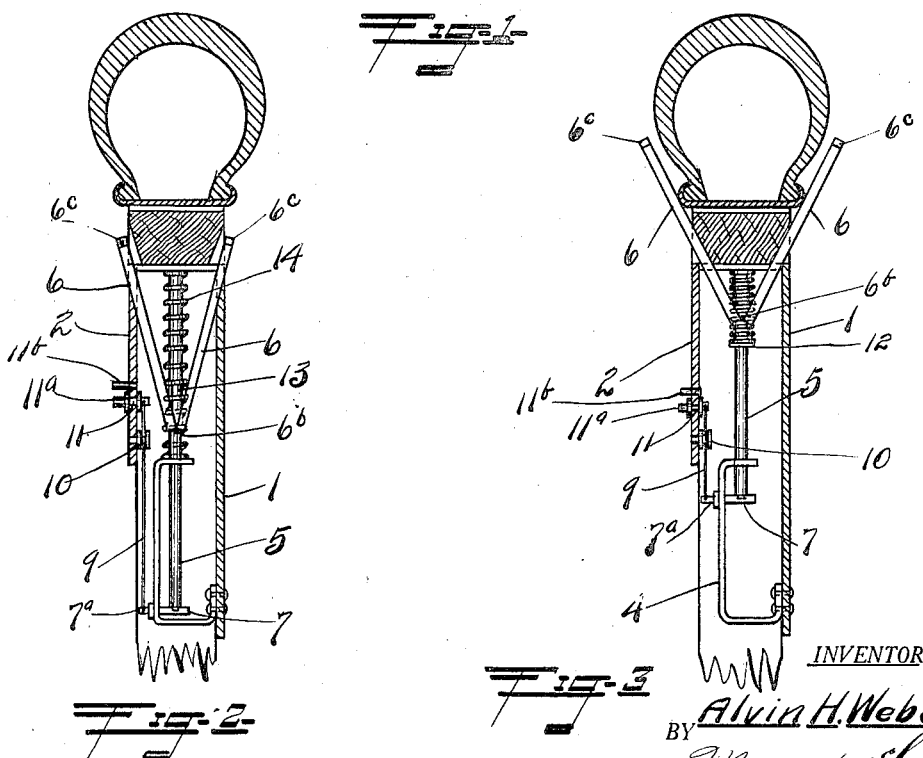
INVENTOR.
Alvin H. Weber.
BY
Monroe Carman
ATTORNEYS

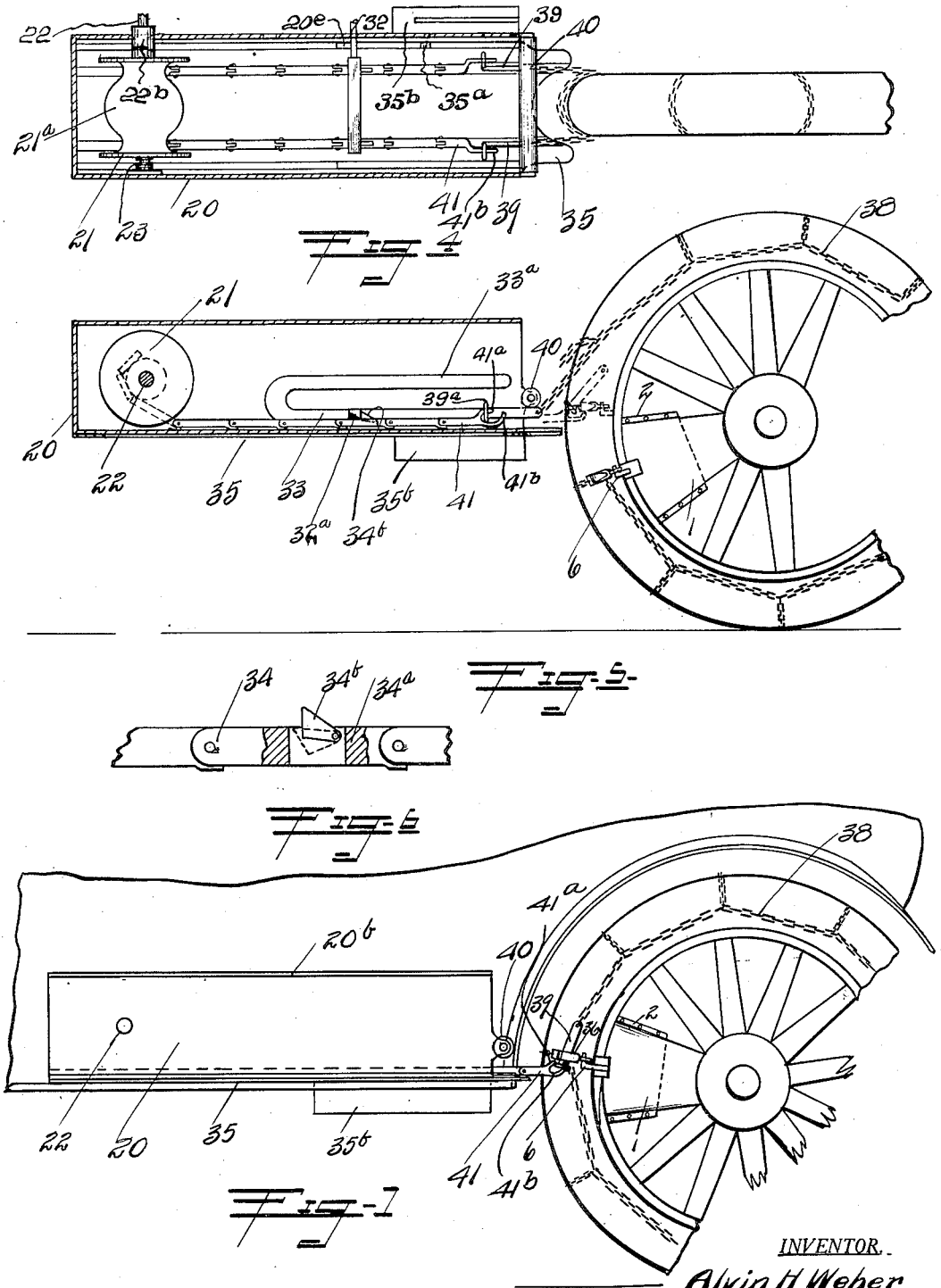

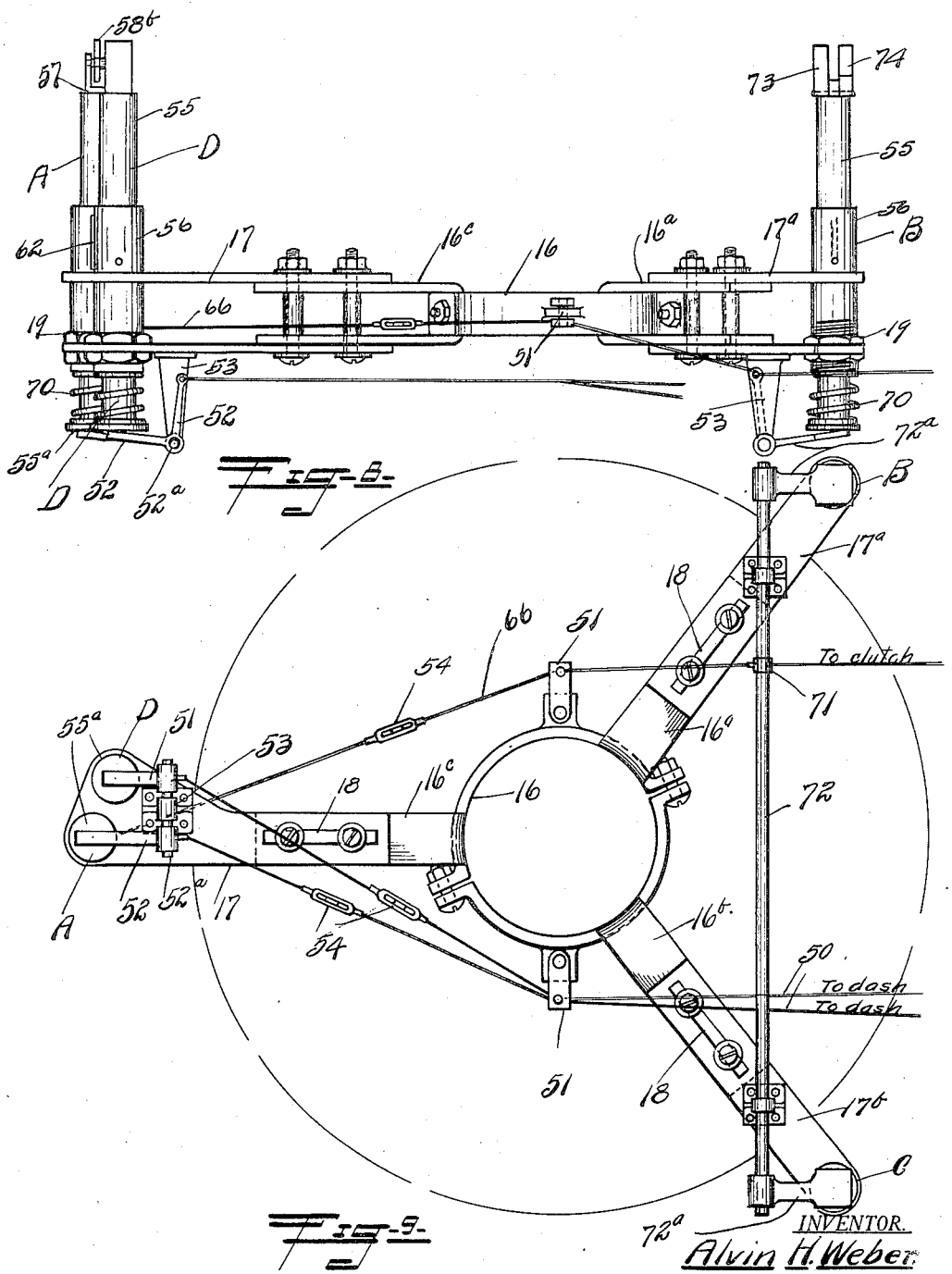

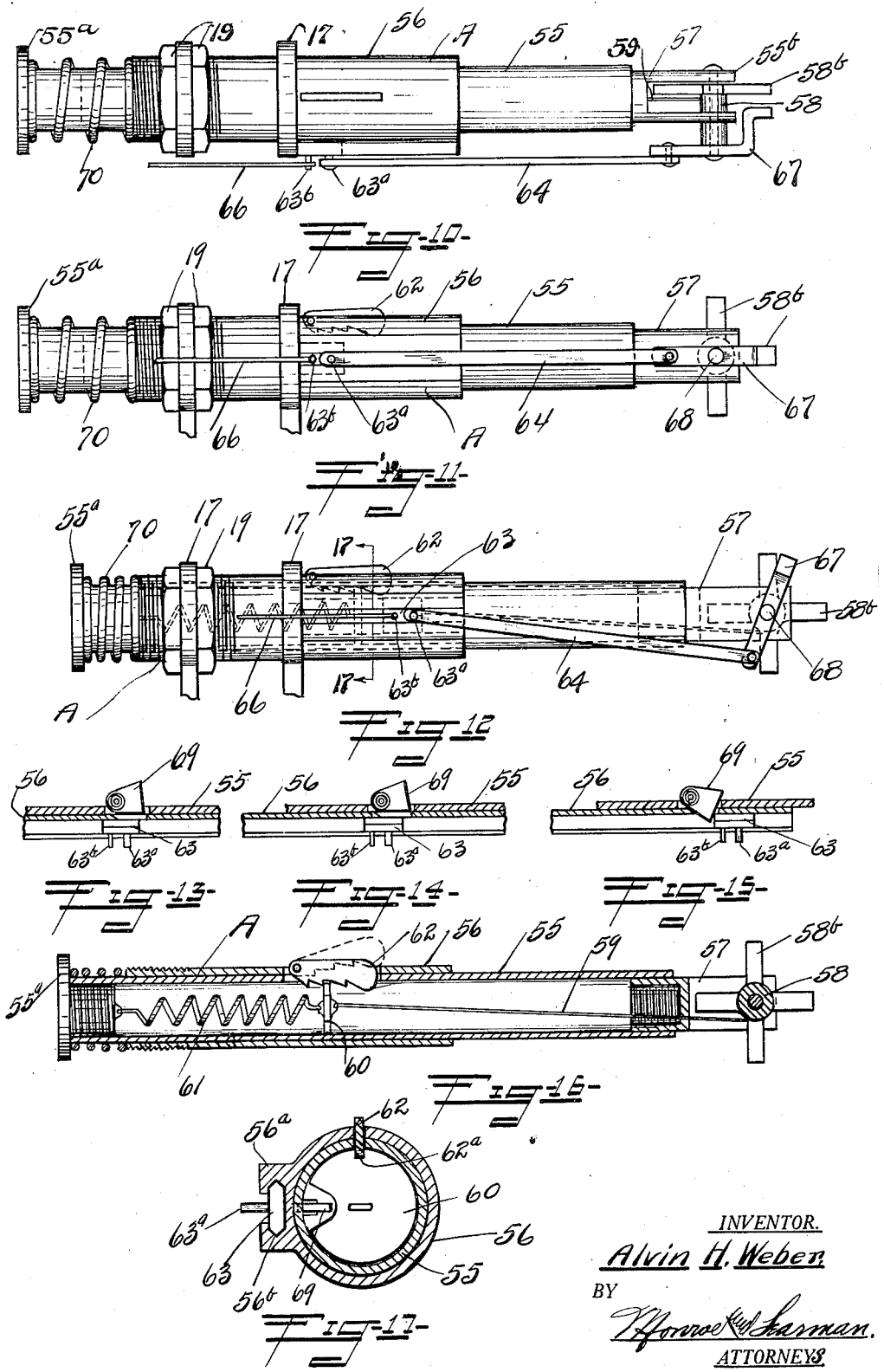

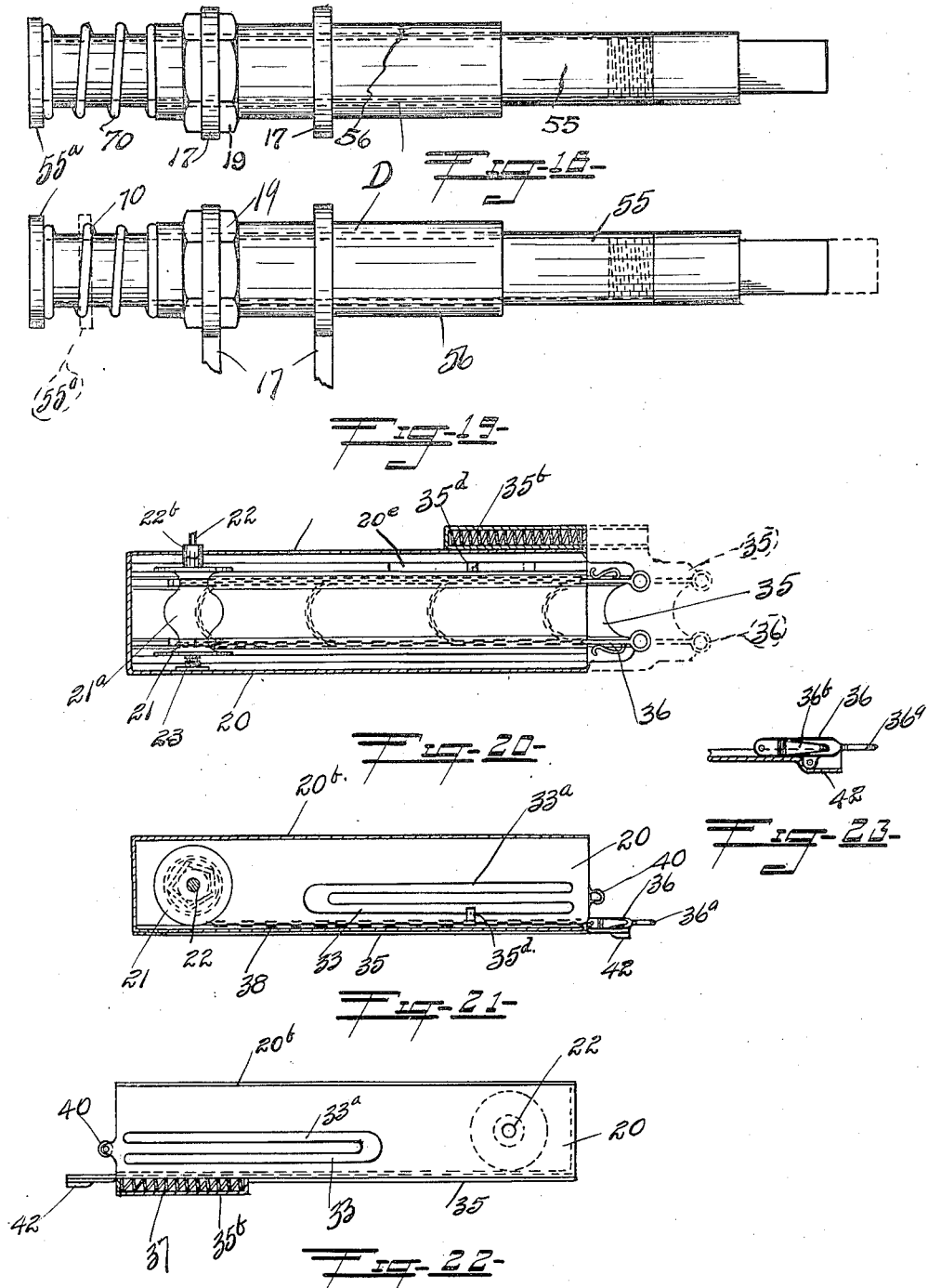

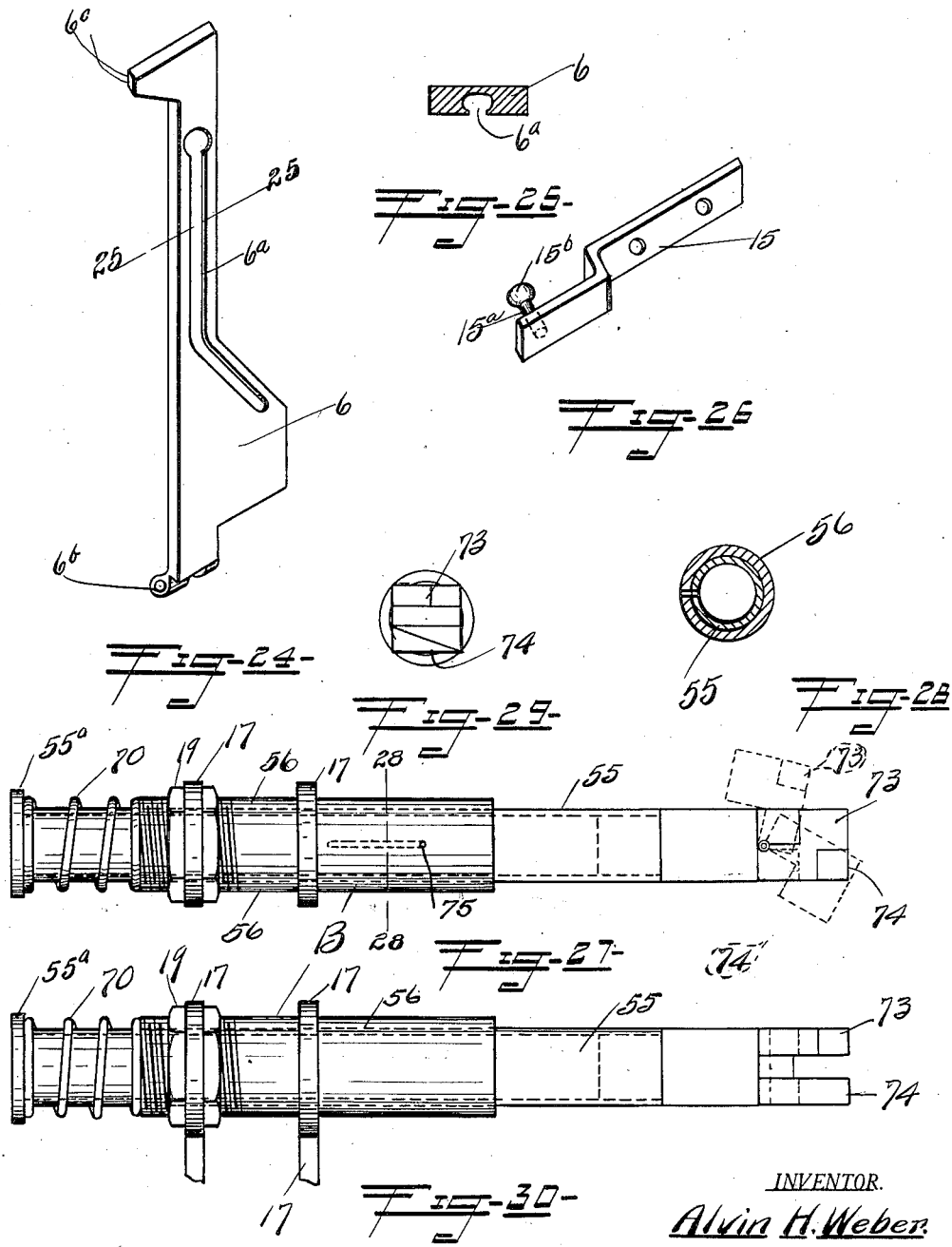

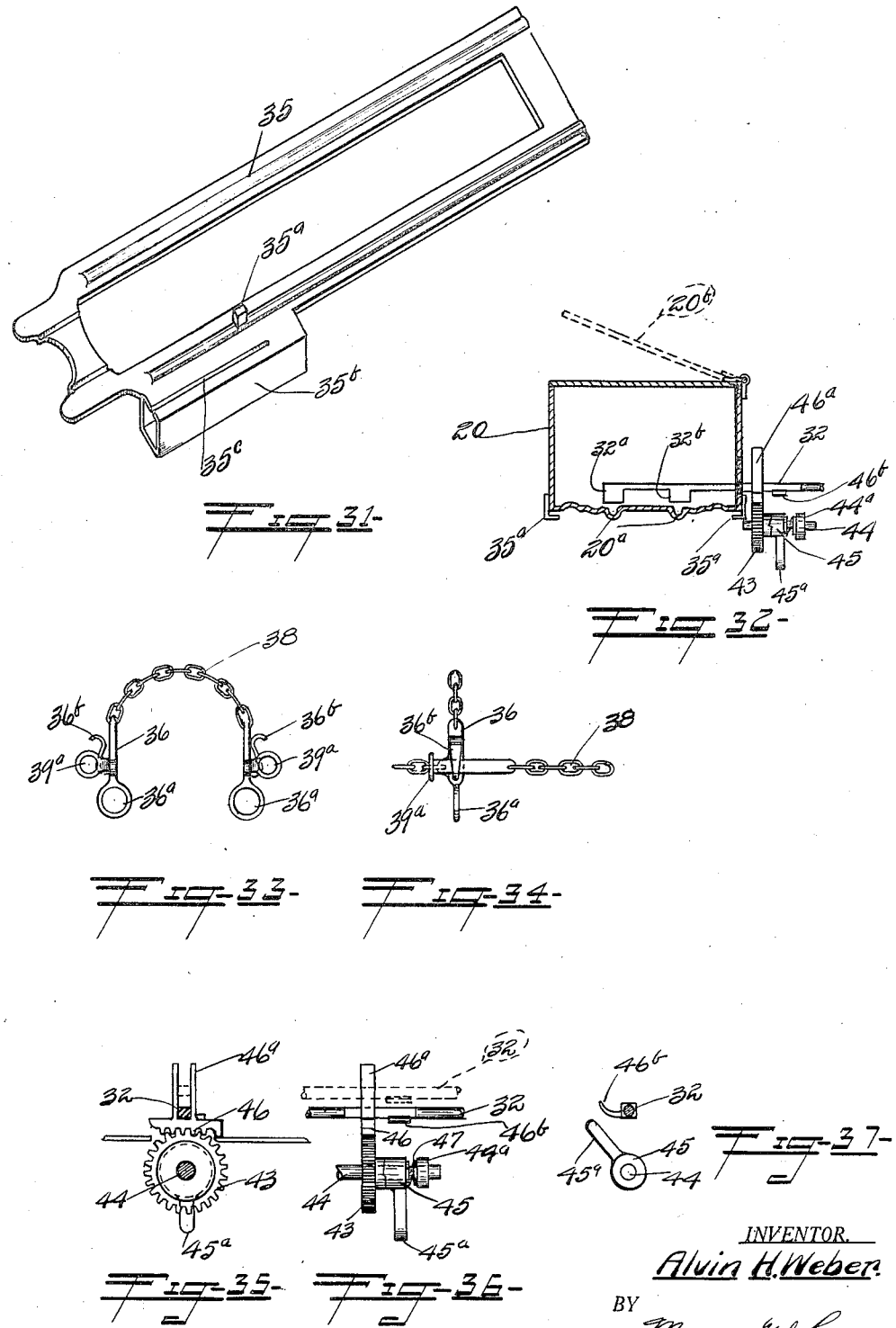

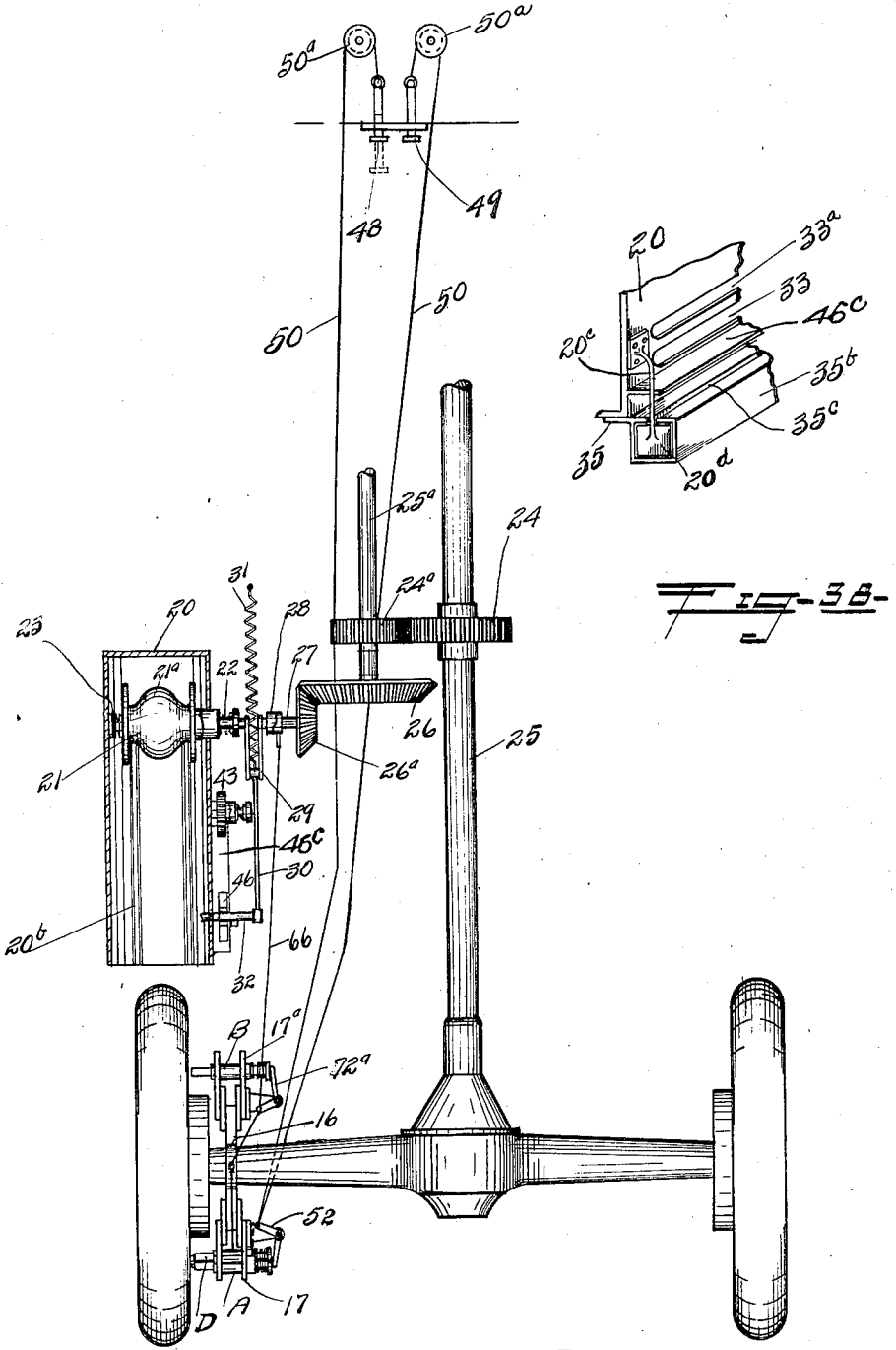

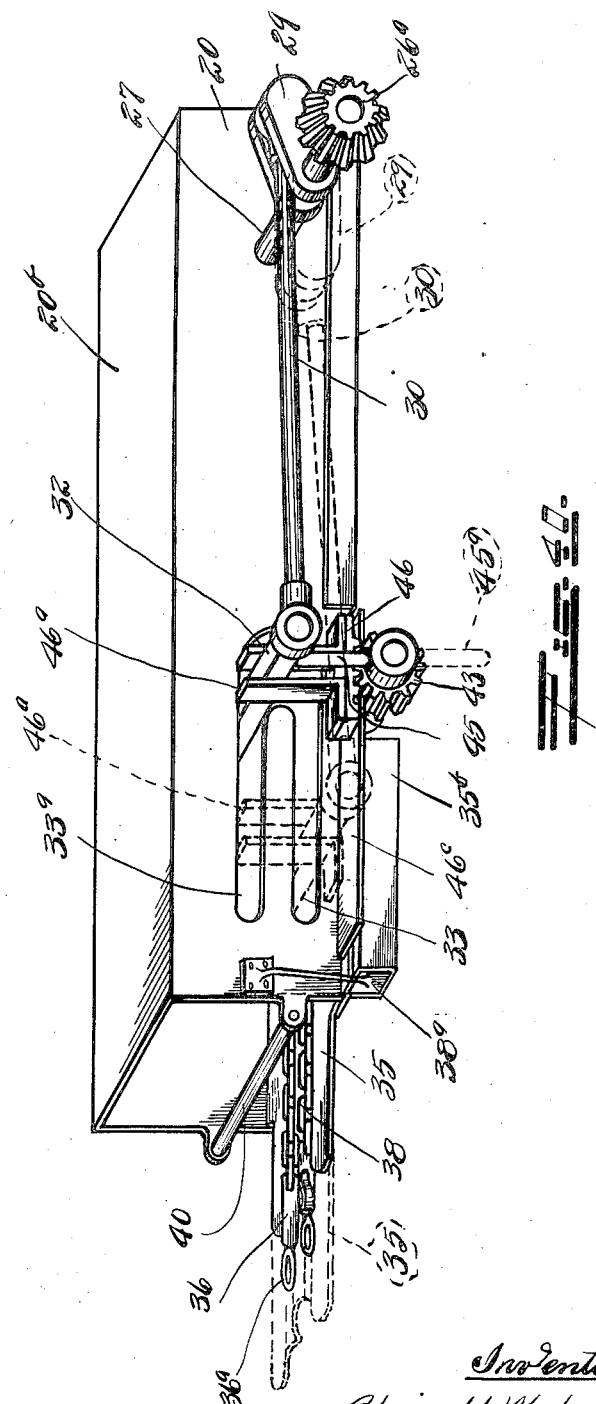

Patented Dec. 26, 1922.

1,439,933

UNITED STATES PATENT OFFICE.

ALVIN H. WEBER, OF BAY CITY, MICHIGAN.

ANTISKID-CHAIN APPLYING AND REMOVING DEVICE.

Application filed November 22, 1920. Serial No. 425,836.

*To all whom it may concern:*

Be it known that I, ALVIN H. WEBER, a citizen of the United States of America, and a resident of Bay City, in the county of Bay and State of Michigan, have invented certain new and useful Improvements in Antiskid-Chain Applying and Removing Devices, of which the following is a specification.

This invention relates to new and useful vehicle tire antiskid chains, and means for automatically applying and removing them from the wheels while the vehicle is in motion.

One object of the invention is to provide an antiskid chain which can be automatically applied, and which when in place, will be free to creep on the tire the same as the conventional manually applied chains.

Another object is to provide a container for housing the chains when they are removed from the wheels, which can be secured to the running board of the vehicle, and which will present a pleasing and neat appearance.

A still further object is to provide controlling means which can be secured to the dash of the automobile upon manipulation of which the chains can be applied or removed from the wheels.

With the above and other objects in view, the present invention consists in the combination and arrangement of parts, hereinafter more fully described, illustrated in the accompanying drawings, and more particularly pointed out in the appended claims, it being understood that changes may be made in the size, proportion and minor details of the different parts without departing from the spirit or sacrificing any of the advantages of the invention.

In the drawings:—

Figure 1 is a fragmentary view of the inner side of the ordinary wheel with a pneumatic tire applied thereto, and illustrating the chain engaging means applied thereto.

Fig. 2 is a fragmentary sectional view showing the chain engaging hooks or prongs in retracted position.

Fig. 3 is a view similar to Fig. 2, but showing the hooks or prongs extended for receiving the chain.

Fig. 4 is a sectional plan view of the chain container, and showing the means for extending the end of the antiskid chain for locking it on the tire.

Fig. 5 is a vertical sectional side view showing the chain extending for locking, and showing in dotted lines the position of the end link when extended.

Fig. 6 is an enlarged part sectional detail of the chain.

Fig. 7 is a fragmentary view of the body of an automobile, and showing the end hook of the chain in position for removing the antiskid chain from the wheel.

Fig. 8 is a top plan view of the control cartridges and the support therefor, and Fig. 9 is a side view thereof the brake circle being also shown.

Fig. 10 is an enlarged top plan view of the control cartridge which governs the applying of the antiskid chain.

Fig. 11 is a side view thereof.

Fig. 12 is a view similar to Fig. 11 showing the cartridge extended and in operative position.

Fig. 13 is an enlarged fragmentary sectional detail showing the locking dog for this control cartridge.

Fig. 14 is a similar view showing the parts in different position, and

Fig. 15 is a view showing the dog in locking positon.

Fig. 16 is a vertical sectional view showing the interior of the control cartridge.

Fig. 17 is an enlarged transverse sectional view taken on the line 17—17 of Fig. 12.

Fig. 18 is a top plan view of the control cartridge for removing the antiskid chains from the wheels.

Fig. 19 is a side view thereof and showing in dotted lines the cartridge extended.

Fig. 20 is a top plan sectional view showing the antiskid chain in the container, and showing in dotted lines the tray under the container extended for applying the antiskid chain.

Fig. 21 is a vertical sectional view of the container.

Fig. 22 is a similar view of the opposite side of the container showing the spring container in section.

Fig. 23 is an enlarged fragmentary sectional detail of the end of the tray with one of the end links of the antiskid chain positioned thereon.

Fig. 24 is an isometric view of one of the antiskid chains engaging hooks or prongs.

Fig. 25 is a section thereof taken on the line 25—25 of Fig. 24.

Fig. 26 is an isometric view of one of the prong guides.

Fig. 27 is a top plan view of the control cartridge B.

Fig. 28 is a transverse section thereof taken on the line 28—28 of Fig. 27, and

Fig. 29 is an end view thereof.

Fig. 30 is a side view of the same control cartridge.

Fig. 31 is an isometric view of the tray which is slidably secured beneath the chain container, and Fig. 32 is a transverse sectional view of the container with the tray omitted.

Fig. 33 is an end view of the links on one end of the antiskid chain in locked position.

Fig. 34 is a side view thereof.

Fig. 35 is an enlarged detail of the ratcheting means, and

Fig. 36 is an edge view thereof, showing in dotted lines the shaft raised.

Fig. 37 is an end view illustrating the means for raising the shaft.

Fig. 38 is a fragmentary perspective view of the receptacle illustrating the closure for the end of the small spring container.

Fig. 39 is a top plan view of a portion of the chassis of a motor vehicle with my improved chain applying means applied thereto.

Fig. 40 is an isometric view of the receptacle and the mechanism for actuating the tray.

It is a well known fact that it is a decidedly disagreeable and dirty task to apply the usual antiskid chains to the wheels of an automobile. This is especially true in snow, mud or sandy soil. It is ofttimes the case that the chains are not applied until actually needed, this is, until the automobile is stuck in the mud, snow or sand. It is then a very tedious, difficult and dirty task.

It is also an object of the invention to be able to remove the chains by manipulation of a control button after the chains have been applied and have been through mud, etc. Usually the driver leaves them on, even when they are not necessary, as he does not wish to handle the chains when muddy. The tires and chains are thus subjected to unnecessary wear due to this cause.

Referring now more particularly to the accompanying drawings, in which I show the preferred embodiment of my invention, I provide a pair of plates which I secure to the spokes of the wheels and which are indicated by the numerals 1 and 2, the inner plate 2 is considerably shorter than the outer plate 1, and has formed therein the curved slot 3, the ends of which are formed with enlarged recesses for a purpose to be presently described.

Secured to this plate 1 by means of rivets or the like is the member 4 bent as shown, extending upwardly and being provided with an opening in the top thereof adapted to receive the pin member 5. Hooks or prongs 6 are suitably hinged to the upper end of the member 5, the opposite end being seated in the member 7, which is formed with a laterally extending portion $7^a$ projecting through the slot $4^a$ in the member 4 and is slidably secured therein. A small cable 9 is anchored to this portion $7^a$ extending upwardly and between the small sheave member 10 and $10^a$, revolubly secured to the inner side of the plate 2, thence passing up and being anchored to the inner hub of a sheave 11 which is adapted to travel in the slotted guideway 3. This sheave 11 is further provided with an outwardly projecting hub $11^a$ which is adapted to contact with the end of the control cartridges as will be hereinafter explained.

Secured to the top of this pin member 5 is a flat offset plate 12 and this plate is provided with a suitable opening therein for the reception of a vertically disposed pin member 13 about which is coiled the spring member 14, the opposite end of the pin 13 being secured to the felly of the wheel in any approved manner.

I wish to direct particular attention to the chain engaging hooks or prongs 6 which are formed as clearly shown in Figs. 24 and 25 of the drawing. These hooks have openings $6^a$ therein. Clips or guides 15 are secured to the inner side of the plates 1 and 2 and are bent as shown and have formed integral therewith a laterally projecting portion $15^a$ provided with an enlarged head $15^b$ adapted to be received within the slotted openings $6^a$. These hooks are formed with the portions $6^b$ and are adapted to be hinged to the upper end of the pin 5, the upper end of the hooks being formed with a laterally projecting tapered portion $6^c$ which normally extends through openings provided in the upper ends of the plate members 1 and 2, and it will be obvious that as these prongs are forced upwardly the angles of the slot $6^a$ will determine the course or path of travel, the openings in the plates being of sufficient size to allow for the limited movement of the prongs.

A supporting member 16 is secured to the rear axle housing of the vehicle, and is preferably formed in two halves as shown and then bolted together.

Radiating from and formed integral with the supporting member 16 are the outwardly extending arms $16^a$, $16^b$ and $16^c$. Extension arms 17, $17^a$ and $17^b$ are adjustably secured to these outwardly extending arms, slots 18 being formed therein and are adapted to receive bolts or the like for adjustment to suit the different sized wheels. Each pair of extension arms is adapted to support one or more cartridges which I shall designate as A, B, C and D, the cartridges A and D being control cartridges for starting and stopping the chain applying or removing mechanism, while the cartridges B and C are operating cartridges, and are controlled by the others before mentioned.

I shall now describe the function of the cartridge A shown in Figs. 10 to 17, the end of which extends outwardly and into the path of the hub member 11$^a$ (when in operative position) and is adapted to force it to the end of the slot 3. The cable 9 being anchored thereto will raise the member 7, and with it the pin 5 and the lateral extension 10, thereby compressing the spring member 14 between the felly of the wheel and this extension 10. The hooks 6 being slidably mounted on the heads 15$^b$ are forced outwardly to the position as shown in Fig. 3. When the sheave 11 reaches the end of the slot 3, it falls into the recess 3$^a$ and is held in this position by the compression of the spring member 14, and this I term the first unit of my device.

For housing the antiskid chains when not in use, I provide a container 20 formed with ways or channels 20$^a$ in the bottom thereof to accommodate the chain as it travels in and out. It is further provided with a hinged cover 20$^b$ for ready access to the interior thereof. These chains are adapted to be wound on a flanged drum member 21 when not in use, said drum having an enlarged center 21$^a$ to accommodate the cross links of the antiskid chains so that they will properly nest thereon. A shaft 22 extends through the drum and is journaled to the box as shown, the inner end of the drum being formed with an enlarged hub which is adapted to mesh with the member 22$^b$ solid on the said shaft. This will allow the drum to ratchet on the shaft should the chain become fast in any manner. A spring member 23 is interposed between the drum and the wall of the container for forcing the drum into mesh with the member 22$^b$. A gear 24 is secured on the drive shaft 25 of the vehicle, meshing with and imparting motion to the gear 24$^a$ carried on the longitudinal shaft 25$^a$. A bevel gear 26 is also carried by said shaft and meshes with the gear 26$^a$ set on a transverse shaft 27, any suitable clutching mechanism 28 being employed to operate the drum 21. An eccentric 29 is provided as shown, and has a connecting rod 30 secured thereto, a coiled spring member 31 being secured to the connecting rod 30, the opposite end being anchored to the frame of the vehicle for bringing the mechanism to the same relative position at the end of the operation.

Secured to the end of the connecting rod is the transversely disposed shaft 32, which extends into the container 20 through a suitable opening 33 on the inner side thereof, this shaft being formed with the lugs 32$^a$ and 32$^b$, which are adapted to engage certain links 34$^a$ of the chain 34 and force them outwardly in the direction of the wheel.

As shown in Fig. 6 of the drawings the links 34$^a$ have an opening therein in which is pivoted the dog member 34$^b$. This member normally is in upright position as shown in full lines, and the said lugs engage the dogs as described when the eccentric travels in the direction of the wheel, the lugs forcing the dogs to the position as shown in dotted lines, and riding thereover on the return stroke.

A tray member 35 is slidably mounted in the clips 35$^a$ secured to the side of the container, the forward part being formed as shown in Fig. 31 to embrace the tire of the wheel, the end link 36 of the chain resting in the ways therein which are formed to receive same. This also serves as a stop when the chain is being removed from the wheel as shown in Fig. 23.

A small container 35$^b$ is formed integral with the tray, the upper surface being slotted as shown at 35$^c$, the front end being open. A coiled spring member 37 is housed in this container, an arm 20$^c$ being secured to the large container 20 and is provided with an enlarged portion 20$^d$ which is adapted to form a closure for the open end of the container 35$^b$.

Also formed integral with the tray member 35 is the upstanding lug member 35$^a$, and when in assembled position this lug projects through the slotted opening 20$^e$ formed in the bottom of the receptacle 20. This lug extends into the path of the shaft member 32, and it will be obvious that as the eccentric 29 revolves, the shaft 32 will contact with the lug 35$^a$ and force the tray outwardly thereby compressing the spring 37 which will force the tray to its original position on the return stroke of the eccentric.

The antiskid chains are of the well known type which creep on the tire after they have been applied, this is, they are not anchored thereto. These antiskid chains 38 are fitted with special end links 36 and 39 as clearly illustrated in Figs. 33 and 34, the member 36 being formed of a bar with an eye 36$^a$ at the end thereof, the opposite ends being connected together by means of the usual cross chains. Integral with and on the outer sides of the members 36 are the clasps 36$^b$. These are formed with an outwardly curved lip which acts as a guide for the opposite end link members 39 which are formed as shown in Figs. 33 and 34, the end with the eye 39$^a$ formed therein being bent at right angles to the main body, and normally the upper part or throat of this clasp rests against the main member 36 and is sprung away therefrom when the member 39 is forced in locked position as shown in Figs. 33 and 34.

Securely anchored to the drum member 21 is the chain 34. This chain is adapted to be wound on the drum when the antiskid chains are not in use, the free end thereof being detachably secured to one end of the antiskid chains, and when the chain applying mechanism is thrown into engagement, the transverse shaft 32 will engage the lugs 35ᵃ of the tray 35 and force it outwardly to position as shown in dotted lines in Fig. 20. The eyes 36ᵃ are thus moved into the path of the ends 6ᵃ of the hook or prongs 6 and are engaged thereby. The chain is thus anchored on these hooks 6 and is drawn out of the container as the wheel revolves, (in reverse direction) a roller member 40 being journaled to the open end of the receptacle to prevent the chain pulling at an angle direct from the drum and to insure it traveling in the ways provided therefor when the chain has assumed the position on the wheel as shown in Fig. 5.

I wish to call attention to the fact that this chain 34 will pivot only in the one direction. The joints are further quite stiff and can be termed spring joints, as they do not bend very easily, and as the drum revolves the chain 34 as unwound and straightened, the wheel pulling the chain therefrom, the mechanism is further so timed that when the chain is in the position shown in Fig. 5, the lugs 32ᵃ and 32ᵇ will engage the dogs 34ᵇ and force the chain outwardly in the direction of the wheel. The end link 41 of this chain is formed similar to the thumb and forefinger of a man's hand, and the thumb 41ᵃ is engaged with the eye 39ᵃ of the antiskid chain when the chain is not in use, and as the dogs 34ᵇ force the chain outwardly, the links 39 will assume the position shown in dotted lines in Fig. 5, and lock the end links together as illustrated in Figs. 33 and 34, and as the wheel continues to revolve, the end of the operating cartridge B contacts with the hub 11ᵃ of the sheave 11, forcing it out of the recess 3ᵃ and the spring 14 will force the prongs to the original position and release the chains, leaving them free to creep on the tire. The raising of the sheave 11 is accomplished by the tapered end portion of the operating cartridge B as will be further explained.

In removing the chains the control cartridge D is operated, the end thereof contacting with the hub 11ᵃ and forcing it to the recess 3 at the end of the slot 3, which of course forces the prongs 6 outwardly, but not their maximum distance, the chain gradually creeping on the tire until the eyes 36ᵃ engage the ends thereof. Cartridge A is then operated and the shaft 32 engages the lug 35ᵈ of the tray 35 forcing it outwardly, the link 41 then assumes the position shown in Fig. 7 and the forefinger 41ᵇ engages the eye 39ᵃ. The vehicle travels slowly forward, the links 39 spring free of the clasps 36ᵇ and the drum revolving winds the chain thereon until the end link 36 enters the stop 42 formed in the end of the tray, the coiled spring 31 drawing the eccentric to the same position at the finish of the operation. In winding the chain on the drum, it will be apparent that the lugs 32ᵃ and 32ᵇ of the shaft 32, must be raised to clear the dogs 34ᵇ, otherwise it would be impossible to wind the chain on the drum 21, and I therefore provide a gear 43 loosely mounted on the transversely disposed shaft 44 which is journaled to the side of the receptacle 20. A rack member 46 having an upwardly extending pair of forks 46ᵃ is adapted to straddle the shaft 32, the hub of the gear 43 being formed clutch shaped to mesh with the hub of the member 45, a spoke member 45ᵃ being formed integral therewith. A collar 44ᵃ is secured to the end of the shaft 44 and a coiled spring 47 interposed between the said collar and the member 45. An outwardly projecting lip 46ᶜ is formed integral with the receptacle 20 and serves as a support and track for the rack member 46, and as the rack oscillates back and forth, it will revolve the member 43 and 45 a portion of a revolution, then ratchet on the return stroke until the arm 45ᵃ strikes the projection 46ᵇ integral with the shaft, lifting it to position shown in dotted lines in Figs. 35 and 36, and into the upper slot 33ᵃ allowing the dogs 34ᵇ to pass and be rewound on the drum. The shaft 32 makes one complete stroke in the upper slot and then drops back to the lower slot, making three complete strokes in this slot before being again lifted into the top slot.

The mechanism is adapted to be controlled at the dash of the vehicle by means of buttons 48 and 49, cables 50 being secured to the ends of the buttons 48 and 49 and are trained over sheave members 50ᵃ, thence extending rearwardly to the cable supports 51 and being connected to one leg of a bell crank member 52 which is keyed on the shaft 52ᵃ, and this dog 69 is released when the bell crank disengages the head of the cartridge A. This shaft is journaled in the bearing 53 which is secured to the extension members 17. Cable supports 51 are pivoted to lugs formed on the member 16 and turnbuckles 54 are provided for the adjustment of these control cables.

As before mentioned the control cable 66 is secured to one leg of the bell crank, the opposite leg extending over and is adapted to contact with the head of the control cartridges, and I shall now describe the operation of the control cartridge A shown in Figs. 10 to 17.

This cartridge comprises a casing 55 having a head 55ª threaded thereinto, said casing being slidably mounted in the member 56 which is rigidly secured in suitable openings in the extension members 17, the outer surface of the member 56 being threaded to receive the lock nuts 19 as shown. A member 57 is threaded into the opposite end of the casing 55 and is formed as shown with jaws 55ᵇ between which is mounted the member 58 having spokes 58ᵇ radiating therefrom. It is further provided with a hub portion about which a cable 59 is adapted to be wound. The opposite end of this cable is anchored to a plunger 60 contained within the member 55, a spring member 61 connecting the plunger with the head of the cartridge, a toothed dog member 62 is hingedly connected to the member 56 and is adapted to hold the plunger 60 in its various positions.

The outer casing 56 is not altogether cylindrical in form, a portion 56ª being formed integral therewith in which are formed ways 56ᵇ, a head 63 being slidably mounted in the said ways, hubs 63ª and 63ᵇ are formed integral with said head, a connecting rod 64 being pivotally secured to the hub 63ª and a cable 66 being anchored to the other, the opposite end of the connecting rod 64 being connected to the member 67 formed as shown and pivoted on the pin member 68, the outer end of this member also extending into the path of the member 11ª, a dog member 69 is pivoted in the inner casing 55 as shown, said casing being slotted directly beneath same, a small spring being carried on the dog 6 for holding it against the casing, and in Figs. 13, 14 and 15 I show a fragmentary section of the two casings and the relative position of the dog member when the casing 55 is forced inwardly. In Fig. 13, the dog is shown in normal position, Fig. 14 illustrates the casing forced further inwardly, while Fig. 15 illustrates the dog dropped into the slot in the outer casing and directly behind the head 63, when the member 68 is turned as shown in Fig. 12 thereby holding it in the position shown in Fig. 15 until the bell crank is released.

A coiled spring 70 is interposed between the head 55ª and the end of the casing 56, and as the control cable 50 is operated it will actuate the bell crank 52, one leg thereof contacting with the head 55ª compressing the spring 70, and extending the member 67 and the spokes 58ᵇ into the path of the hub member 11ª and the member 11ᵇ which is rigid on the plate 2, this of course pulls the cable 66 which is secured to the bell crank 71 solid on the shaft 72, and in turn forces the arms 72ª into contact with the heads of the operating cartridges B and C, the cable also extends to the clutch 28, simultaneously operating said clutch, and as the cable 59 is wound on the hub by reason of the spokes 58ᵇ contacting with the member 11ᵇ and forcing them through an angle of forty-five degrees each revolution, the member 62 will hold the plunger in its various positions, until such time as the plunger striking the downwardly projecting lip 62 forces it to position shown in dotted lines in Fig. 16, allowing the mechanism to spring back to original position, and the clutch to be disengaged. It will also be noted that the plunger 60 is formed to allow the dog 69 to pass same.

Cartridges B and C are constructed substantially the same as the cartridge A, excepting that both casings are cylindrical in form and carry no mechanism, the ends 73 and 74 being hinged to the casing 55, and are formed as shown in Figs. 27, 29 and 30, the jaw 73 being formed as shown in Fig. 27, and is free to swing in the direction indicated in dotted lines, while the opposite jaw 74 is cut at an angle as clearly shown in Fig. 29, and is free to swing in the opposite direction as shown by the dotted lines in Fig. 27, small springs, (not shown) being provided for bringing the jaw back to its original position, and when the sheave 11 is in the recess 3ª, the edge of the jaw 74 will engage it and force it up and out of said recess by reason of this angle on the jaw, and allow it to return to its original position which will naturally force the jaw 73 to position shown in Fig. 27. When the wheel is revolving in the opposite direction, it will contact with the jaws 73 and 74, and force the opposite jaw on the cartridge C in opposite direction, and I wish to direct particular attention to the fact that these cartridges B and C are identically alike excepting that the angle on the jaw 74 is reversed. A small slot is formed in the outer casing 56, and a pin 75 is secured to the inner casing extending through the slot to prevent the casings turning on each other.

Cartridge D is shown in Figs. 18 and 19, and is adapted to be actuated in the same manner as cartridge A, and is used for removing the chains from the wheels. This is of course constructed substantially similar to cartridges A, B and C, excepting that the casing 55 has no hinged end, being merely a squared portion which extends into the path of the member 11ª forcing it into the recess 3ᵇ at the end of the slot 3, this in turn forces the prongs outwardly and into the path of the hooks 6, the chains will gradually creep onto the said hooks, the control button 49 is then actuated outwardly, thereby operating cartridge A, which in turn simultaneously operates cartridges B and C and the clutch 28, thereby causing all of the mechanism to operate, the tray 35 having the end links 41 thereon is forced in the direction of the wheel, the forefinger engaging the end links 39, and then being wound on the drum, the opposite end link 36 of the antiskid chain then assumes the position as shown in Fig. 23. The plunger 60 forces the dog 62 upwardly, releasing the mechanism and allowing it to return to original position. The hub member 11ª engages the tapered portion 74 of the cartridge C, raising it out of the recess at the end of the slot, and the prongs are returned to their original position.

While operating mechanism is shown for but one side of the vehicle, it will be readily understood that both sides are identically alike.

From the foregoing description it will be obvious that I have perfected a new and improved mechanism for applying and removing antiskid chains from the wheels of vehicles, as well as providing a storage container for the chains when not in use.

What I claim is:—

1. Means for applying antiskid chains to vehicle wheels, and comprising a receptacle having a drum journaled therein and on which the chains are adapted to be wound, prongs on the wheels for engaging the ends of the chain, a spring actuated tray slidably mounted beneath the receptacle and adapted to project the ends of the chain into the path of travel of the said prongs, and means for withdrawing the prongs when the chain is applied.

2. In a chain applying device comprising a receptacle having a drum journaled therein, a length of chain attached thereto, antiskid chains attached to the free end of the said chain, and adapted to be wound on the said drum, extendible prongs on the vehicle wheels, and means for extending the same, a tray slidably mounted beneath the receptacle, pockets therein for engaging the ends of the antiskid chains and extending them into the path of the prongs, means for locking the ends of the chain together, and means connected to the drive shaft of the vehicle for driving the said mechanism.

3. A chain applying device comprising a receptacle, having a drum journaled therein, a movable tray slidably secured beneath the receptacle and adapted to carry the end links of the antiskid chains, extendible prongs carried by the vehicle wheels and means for extending same, a post integral with the tray and extending into an elongated opening in the receptacle, a laterally projecting arm extending into a slotted opening in the side of the receptacle and adapted to engage the post for forcing the tray outwardly to carry the links carried thereby into the path of travel of the prongs, means for locking the links together, and means connected to the drive shaft of the vehicle for operating the said mechanism.

4. An antiskid chain applying device comprising a receptacle, a spool journaled therein and upon which the antiskid chains are adapted to be wound, extendible prongs located on the vehicle wheel and means for extending the said prongs, a tray slidably mounted beneath the receptacle and chain engaging pockets therein, control cartridges mounted on the vehicle axle, and adapted when actuated to engage the prong extending means on the wheel for simultaneously extending said prongs and actuating said tray for extending the ends of the antiskid chains in to the path of the prongs, and means connected to the drive shaft of the vehicle for driving the said mechanism.

5. In an antiskid chain applying device comprising a receptacle having a spool journaled therein, and upon which the antiskid chains are adapted to be wound, a chain anchored to the spool and detachably engaging the ends of the antiskid chain, extendible prongs on the vehicle wheel and means for extending same, a tray slidably mounted beneath the receptacle and provided with chain engaging pockets in the ends thereof, a spider clamped to the vehicle axle and control cartridges mounted thereon, a cable control adapted when actuated to engage the prong extending means for extending the prongs, said control simultaneously connecting the tray actuating mechanism for projecting the ends of the antiskid chain into the path of the prongs.

6. In combination with a motor vehicle, a receptacle mounted adjacent the wheels thereof and a drum journaled therein and on which the antiskid chains are adapted to be wound, extendible prongs on the vehicle wheels and means for extending same, a tray slidably mounted beneath the receptacle and provided with pockets for engaging the ends of the antiskid chain, a spider clamped to the vehicle axle, and control cartridges mounted thereon, means for actuating said cartridges to engage the prong extending means for extending the prongs and simultaneously actuating the tray operating mechanism for extending said tray and the ends of the antiskid chain into the path of the said prongs, and means for releasing the prong extending means to allow the prongs to be retracted.

7. The combination with a motor vehicle, of an antiskid chain applying device comprising a receptacle having a spool revolubly mounted therein, a chain anchored to said drum, and antiskid chains detachably secured to the free ends thereof, chain extending means beneath the container, plates secured to the wheels and extendible prongs housed therein, a spider on the vehicle axle, and control cartridges mounted thereon and adapted when actuated to engage the prong extending means for extending the prongs and simultaneously actuate the chain extending means to move the ends of the chain into the path of travel of said prongs for engagement thereby, spring actuated dogs on the chain, and means connected to the driving mechanism of the vehicle for forcing the ends of the antiskid chains into locked position.

8. The combination with a motor vehicle, of an antiskid chain applying device comprising a container and a drum revolubly mounted therein, a chain anchored to said drum, and an antiskid chain detachably secured to the free end thereof, chain engaging means secured to the vehicle wheel, and means mounted on the axle for actuating the said chain engaging means, an eccentric on the drum shaft and a connecting rod secured thereto, a transversely disposed shaft carried by the said connecting rod and extending through a slot into said container, spring actuated dogs on said chain adapted to contact with said shaft at predetermined intervals for raising it to allow the chain to be rewound on the drum when the direction of travel of the vehicle is reversed, and means for actuating said mechanism.

9. An antiskid chain applying and removing device comprising a container, a drum journaled therein, a chain anchored to said drum, the free ends thereof detachably engaging the ends of the antiskid chains, chain engaging means adjustably secured to the wheel, means attached to the vehicle for actuating said chain engaging means, an eccentric carried by the vehicle and a transverse shaft attached to said eccentric and extending into said container and adapted to engage the dogs located on the chain at predetermined intervals for raising the said transverse shaft to allow the chain to be rewound on the drum, and means for actuating said mechanism.

In testimony whereof I affix my signature.

ALVIN H. WEBER.